United States Patent
Bade et al.

(10) Patent No.: US 7,099,477 B2
(45) Date of Patent: Aug. 29, 2006

(54) METHOD AND SYSTEM FOR BACKUP AND RESTORE OF A CONTEXT ENCRYPTION KEY FOR A TRUSTED DEVICE WITHIN A SECURED PROCESSING SYSTEM

(75) Inventors: Steven A. Bade, Georgetown, TX (US); David Carroll Challener, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 10/970,459

(22) Filed: Oct. 21, 2004

(65) Prior Publication Data

US 2006/0088167 A1    Apr. 27, 2006

(51) Int. Cl.
*H04L 9/00* (2006.01)
(52) U.S. Cl. .................. 380/279; 380/281; 380/282
(58) Field of Classification Search ................ 380/279, 380/281, 282
See application file for complete search history.

(56) References Cited

U.S. PATENT DOCUMENTS

| | | |
|---|---|---|
| 2003/0056109 A1 | 3/2003 | Elliot et al. |
| 2003/0115453 A1 | 6/2003 | Grawrok |
| 2003/0188162 A1 | 10/2003 | Candelore et al. |
| 2003/0226040 A1 | 12/2003 | Challener et al. |

FOREIGN PATENT DOCUMENTS

| EP | 1076279 A | 2/2001 |
|---|---|---|
| WO | WO01/52234 A | 7/2001 |

OTHER PUBLICATIONS

RSA encryption using extended modular arithmetic on the Quicksilver COSM adaptive computing machine Puttegowda, K.; Athanas, P.; Field-Programmable Custom Computing Machines, 2003. FCCM 2003. 11th Annual IEEE Symposium on Apr. 9-11, 2003 pp. 305-307.*
Context and Location-Aware Encryption for Pervasive Computing Environments; Al-Muhtadi, J.; Hill, R.; Campbell, R.; Mickunas, M.D.; Pervasive Computing and Communications Workshops, 2006. PerCom Workshops 2006. Fourth Annual IEEE International Conference on Mar. 13-17, 2006 pp. 283-289.*

(Continued)

*Primary Examiner*—David Jung
(74) *Attorney, Agent, or Firm*—Mitch Harris, LLC; Andrew M. Harris; Casimer K. Salys

(57) ABSTRACT

A method and system for backup and restore of a context encryption key (CEK) for a trusted device within a secured processing system maintains security of virtualized trusted device contexts, providing for replacement of a trusted device in the field. The CEK is encrypted along with a system identifier by a random number to yield a first result. The first result is again encrypted with a manufacturer public key. The resulting blob is stored along with the random number. To restore, the system sends the blob and the device ID to a server. The server obtains the first result by decrypting with the manufacturer private key, re-encrypts with the device public key and sends the new result back. The system sends the new result to the device along with the associated random number. The device decrypts the new result using its private key and decrypts the CEK using the random number.

21 Claims, 4 Drawing Sheets

OTHER PUBLICATIONS

IAuth: An authentication system for Internet applications Suan-Suan Chew; Kok-Leong Ng; Chye-Lin Chee; Computer Software and Applications Conference, 1997. COMPSAC '97. Proceedings., The Twenty-First Annual International Aug. 13-15, 1997 pp. 654-659.*

U.S. Appl. No. 10/835,503, filed Apr. 29, 2004, Bade et al.
U.S. Appl. No. 10/835,498, filed Apr. 29, 2004, Bade et al.
U.S. Appl. No. 10/835,350, filed Apr. 29, 2004, Bade et al.
U.S. Appl. No. 10/835,330, filed Apr. 29, 2004, Bade et al.

* cited by examiner

METHOD AND SYSTEM FOR BACKUP AND RESTORE OF A CONTEXT ENCRYPTION KEY FOR A TRUSTED DEVICE WITHIN A SECURED PROCESSING SYSTEM

CROSS-REFERENCE TO RELATED APPLICATIONS

The present application is related to co-pending U.S. patent application Ser. No. 10/0970461, entitled "METHOD AND SYSTEM FOR VERIFYING BINDING OF AN INITIAL TRUSTED DEVICE TO A SECURED PROCESSING SYSTEM", filed concurrently with the present application. The specification of the above-referenced Patent Application is herein incorporated by reference.

BACKGROUND OF THE INVENTION

1. Technical Field

The present invention relates generally to security in processing systems, and more particularly, to a methodology for backing up and restoring keys for exporting and importing machine contexts in a replacement device when no functioning trusted device is available.

2. Description of the Related Art

Present-day computing systems, and in particular large-scale server systems, often include support for running multiple virtual machines. The system may be a large-scale on-demand server system that executes hundreds of server instances on a single hardware platform to support customers with varying computing requirements. In the most flexible of these systems, multiple partitions, which may differ in operating system and application mix, are concurrently present in system memory and processes executing in each partition are run in an environment that supports their execution on a guest operating system. The virtual machine provides an environment similar enough to a real hardware platform that the operating system can run with little or no modification. A hypervisor (sometimes referred to as a virtual machine monitor) manages all of the virtual machines or partitions and abstracts system resources so that each partition provides a machine-like environment to each operating system instance.

To implement the above architectural goals, multiple processing modules and other devices are installed in a system, and each device generally supports one or more of the above-described partitions, although it is possible to share tasking on a partition between multiple devices. Groups of devices or an individual device may be associated with a particular customer and it is desirable to secure access to a device or group by only that customer including securing the devices from the manufacturer of the devices and system.

The above-incorporated Patent Application describes a mechanism for binding an initial trusted device to the system, when either a first trusted device is newly installed in a system or when replacing the last trusted device in a system previously populated with one or more trusted devices. The mechanism provides for field binding and remote verification of a trusted device. Typically such binding has to be performed at the manufacturer's site for security reasons, but the above-incorporated Patent Application discloses installation and replacement alternatives that can be performed in the field. However, there are other security mechanisms that are also unique to a trusted device (or group of trusted devices) that also require tokens that are typically only installed at the manufacturer's sites or generated within the device itself. One such security mechanism is known as a "Context Encryption Key"—a symmetric key that is used to import and export trusted device states (contexts) to and from one or more trusted devices so that virtual machines (or at least the trusted device portion of a virtualized machine state) can be "swapped out" or stored at a fault or power-down. The contexts of the trusted devices are stored on external storage outside of the trusted devices, but are secured cryptographically when outside the trusted devices. The CEK is typically generated within the initial trusted device in the system and is propagated as needed to other trusted devices in the system after they are bound.

However, when installing a replacement trusted device when no other trusted device remains in the system, a newly-generated CEK cannot decrypt existing exported contexts for the virtualized trusted devices that were either running on the system at failure or shutdown or were swapped out to storage.

Therefore, it would be desirable to provide a mechanism to securely backup and restore a context encryption key from a predecessor device and to a replacement trusted device of a system. It is also desirable that the restore be performed when no other device having the key is present in the system. It would further be desirable to provide such a method in which the manufacturer verifies that the CEK is being installed in a device that is properly bound to a particular system.

SUMMARY OF THE INVENTION

The objective of providing a secure mechanism for backing up and restoring a context encryption key, is accomplished in a method and system. Portions of the method may be embodied in computer program products for execution on various processing systems associated with each portion.

The method includes backing up a context encryption key (CEK) within the system by generating an encrypted blob within a trusted device and sending it to the system for storage. The blob includes the CEK along with a system identifier and is symmetrically encrypted by a one-time random number (or "nonce") and then encrypted again with the manufacturer's public key. The random number and the resulting encrypted blob are sent to the system for storage.

When it is necessary to populate a replacement device with the CEK when no other trusted device is available containing the CEK, then the blob is retrieved and sent to the manufacturer's server along with a replacement device identifier. The server decrypts the blob using the manufacturer's private key and then re-encrypts the blob using a replacement device public key retrieved from a database using the device identifier after the server verifies that the device and system are properly bound together. The server then sends the re-encrypted blob to the system, which passes it back to the device along with the original random number associated with the blob. The replacement device then decrypts the re-encrypted blob using its private key and further decrypts the blob using the random number to retrieve the system identifier and CEK. The device verifies that the system identifier matches and then installs the CEK.

The foregoing and other objectives, features, and advantages of the invention will be apparent from the following, more particular description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
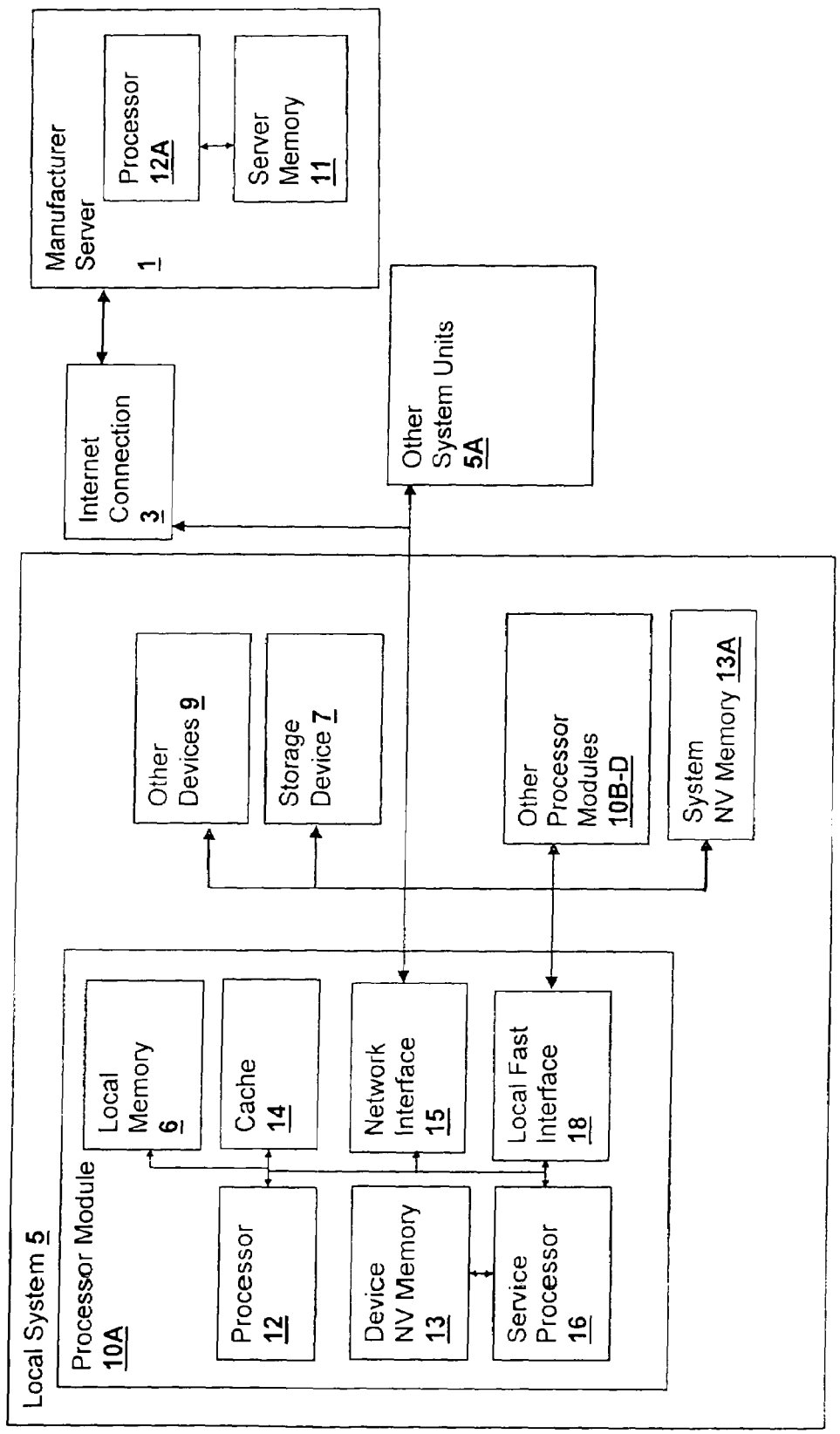
FIG. 1 is a block diagram of a computing system in which an embodiment of the invention is practiced.

With reference now to the figures, and in particular with reference to FIG. 1, there is depicted a block diagram of a system in which an embodiment of the present invention is practiced. It should be understood that the depicted embodiment is not intended to be limiting, but only exemplary of the type of processing system to which the methods and techniques of the present invention may be applied. The system includes a secured local system 5 having four processor modules (processor module 10A and three other identical processor modules 10B–D). Local system 5 may be connected to other system units 5A forming a super-scalar processing system. The local systems are connected to a manufacturer server 1 via an Internet connection 3 or an alternative network interface. Manufacturer server (which may be the Credential provider server of the above-incorporated Patent Application) includes a processor 12A for executing server program instructions in accordance with an embodiment of the present invention and a server memory 11 for storing the program instructions and data.

Each processing module 10A, 10B–D includes a processor 12 for executing program instructions, a local memory 6 that is generally mapped as system memory accessible by other processor modules 10B–D and a cache 14 for storing data and program instructions. Processing modules 10A, 10B–D also each includes a non-volatile memory 13 that stores values used by the method of the present invention to verify that processor modules 10A, 10B–D are installed in the system to which they are bound. Processor modules 10A, 10B–D also each may include a service processor 16 which may carry out the security functions of the present invention, or alternatively processor 12 may perform the tasks described in further detail below. Processor modules 10A, 10B–D also include a local fast interface 18 for intercommunication with other modules in local system 5, and a network interface 15 for communication with other system units 5A and Internet connection 3. Local system also includes a storage device 7 as well as other devices 9, to which the binding techniques of the present invention may be applied. A system non-volatile memory 13A (which includes disc storage) is also included for storing CEK backup information and other system values associated with the security techniques of the present invention, such as the system serial number or other identifiers, along with binding verification data as described in the above-incorporated Patent Application.

Within system local memory 6, a virtual machine monitor program, or "hypervisor" provides support for execution of multiple virtual machines (VMs) or "partitions" that each provide an execution environment for an operating system and a number of "guest" programs (applications and services executed by an operating system and running in the associated VM). For various reasons such as system or device failures, system shutdown and swapping of virtual machines in and out of trusted devices, virtual machine contexts are stored offline. In particular, if the last trusted device in the system fails, it will be necessary to export all contexts from the virtual machines, if possible, in order that they may be recovered later. The contexts are cryptographically protected when outside of a trusted device and for this purpose, a context encryption key (CEK) is installed in the trusted devices. The devices can thereby decrypt imported contexts and encrypt contexts for export to storage device 7 or other location. Contexts include the complete state of the virtualized trusted device or devices within a particular trusted platform, which is generally data information, but may be extended to include the complete state of the virtual machine including both static and dynamic data and/or program instructions. The contexts must only be executable or readable on particular trusted devices, which may be all of the trusted devices in a system or a subgroup of trusted devices associated with a particular customer or application.

The present invention uses both symmetric and asymmetric encryption to secure the installation of the CEK into a replacement trusted device, such that the manufacturer cannot decrypt trusted device contexts and so that the end user cannot subvert the manufacturer's requirements for a trusted device. The CEK is obtained from a backup previously stored in the system. The backup is effectively crytographically passed through a third entity, thereby preserving the security of the CEK at all times. The architectures to which the present invention applies include the variants described in the above-incorporated Patent Application, and depend on trusted device bindings for confidence in the security of the physical hardware used to implement the trusted devices. The trusted devices are shared between multiple virtual machines, each virtual machine has its own unique set of "trust properties", which are stored as contexts when outside of the trusted platform devices.

However, the techniques of the present invention could also be used to restore a CEK that has been lost to a device, or install another CEK on a device, effectively repairing a device or adapting it to read saved contexts, for example if a trusted device is being assigned to another processing device subgroup that has a different CEK.

Further, it should be understood that the techniques of the present invention apply not only to trusted devices, but to any device for which it is useful to import and export contexts securely or when a backup copy of a key must be securely passed to a device, avoiding interception and replication of the key transfer. For example, files within storage devices could be cryptographically bound to the device or an array system so that stored data can only be read by the device electronics or array controller and upon field repair or remote upgrade of the device electronics or array controller, a new key must be installed. The present invention provides a general technique for backing up and restoring a CEK to a device. Therefore, it should be understood that the following description, while referring for illustrative purposes to a binding of processor module 10A to local system 5 applies to binding of other devices and other systems, as well.

Figure 2:
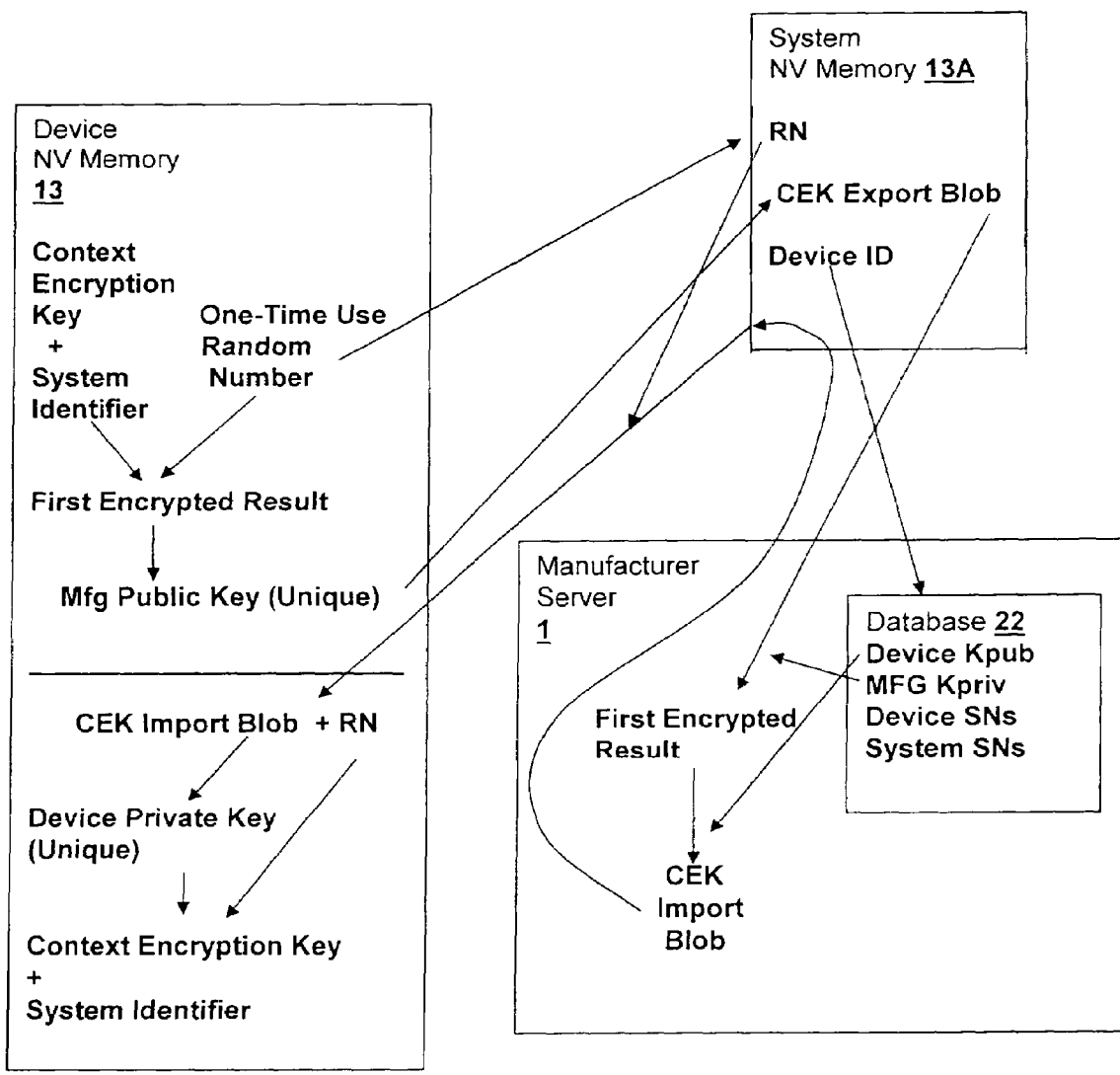
FIG. 2 is a block diagram of a system memory image in accordance with an embodiment of the present invention.

Referring now to FIG. 2, a block diagram is shown depicting memory images and information flow within the computer system of FIG. 1. Within device non-volatile memory 13, a device specific identifier is stored, along with a unique device-specific key pair installed at the time of device manufacture and a manufacturer's public key for sending cryptographic communications to manufacturer server 1.

In order to back up a CEK installed on a trusted device for future repair, the device (for illustrative purposes processor module 10A) generates a one-time use random number (nonce), which the device then uses to encrypt the CEK and a system-specific identifier. The system specific identifier was previously provided by local system 5 to processor module 10A from system non-volatile memory 13A (or can be accessed from system non-volatile memory 13A directly by processor module 10A). The first encrypted result is again encrypted using the manufacturer's public key that is stored in processor module 10A. The second encrypted result (CEK Export Blob) along with the associated random number (RN) is then sent to another place in local system 5 for storage. The above backup process can be repeated as many times as is desired, rendering a unique result each time due to the one-time random number.

When it is necessary to install the CEK on a replacement device when no other trusted device is available, the CEK can be retrieved from the backup stored on local system 5, but only with the participation of manufacturer server 1 which can stop the transfer if an invalid device/system combination is detected. Local system 5 sends the CEK Export Blob along with the replacement device identifier to manufacturer server 1, which decrypts the blob using the manufacturer's private key. The manufacturer re-encrypts the extracted result (the first encrypted result above) using a device-specific public key retrieved from database 22 using the replacement device identifier sent by local system 5 to form a CEK Import Blob. First, server 1 verifies tat the device ID and system ID are properly associated and that the device is bound to the system platform, otherwise server 1 will not complete its portion of the CEK restore process.

Because of the double-wrapping mechanism (mfgr's key pair or device key pair encrypted over the random number encryption) the manufacturer need never "see" the CEK during this process, and the communications between manufacturer server 1 and local system 5 likewise never expose the CEK.

Manufacturer server 1 returns the re-encrypted CEK Import Blob to local system 13A, which passes the blob to the replacement device along with the associated random number (RN). The device then uses its device-specific private key to decrypt the CEK Import Blob, retrieving the original first encrypted result and then decrypts the first encrypted result using the RN to extract the CEK and the system identifier. Upon verifying that the system identifier of the doubly-decrypted blob matches the system to which the replacement device is bound, the device installs the CEK for use in exporting and importing contexts.

Figure 3:
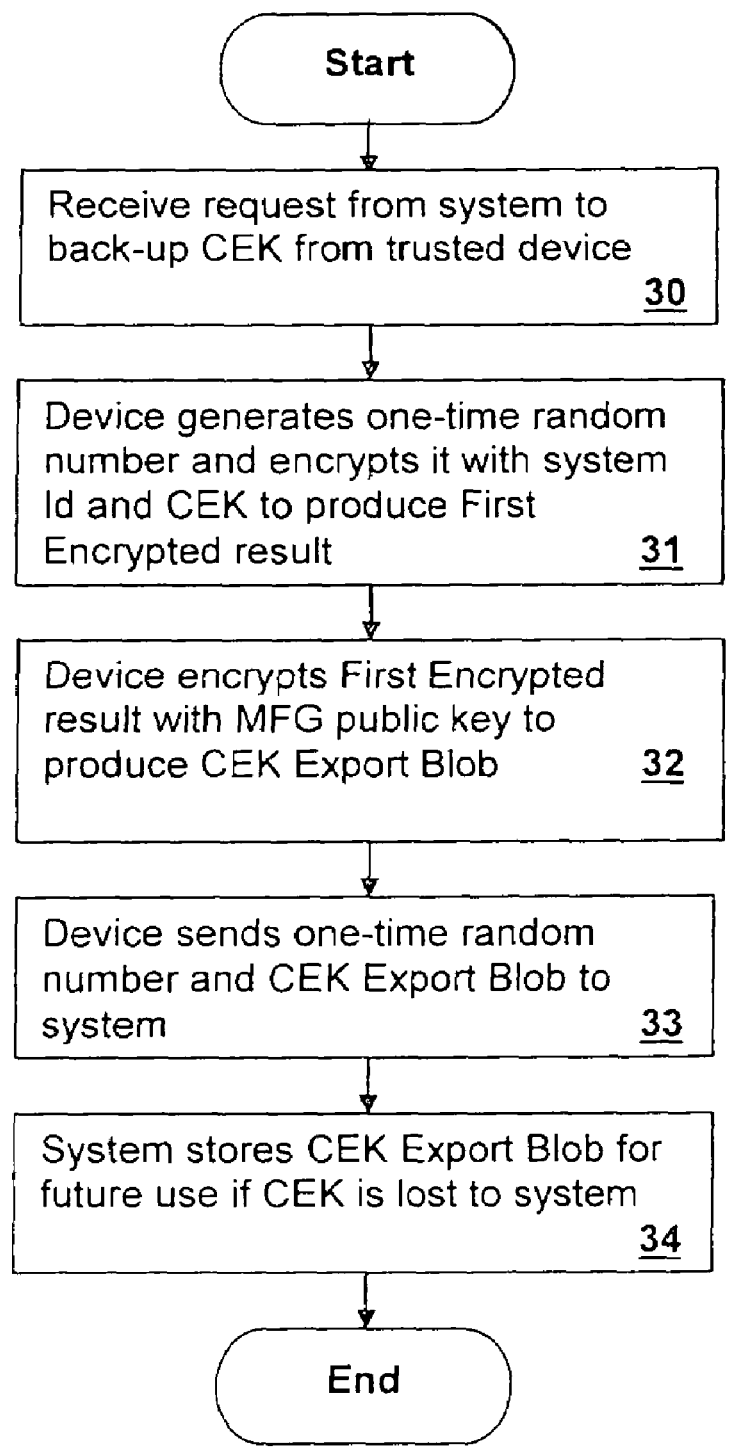
FIG. 3 is a flowchart depicting a portion of a method in accordance with an embodiment of the present invention.

Referring now to FIG. 3, a portion of a method in accordance with an illustrated embodiment of the invention is depicted. When a request is received (generally from the hypervisor system management console) to backup the CEK (step 30), the device generates the one-time random number (RN) and uses it to encrypt the system identifier and CEK to obtain a first encrypted result (step 31). The device then encrypts the first encrypted result with the manufacturer's public key to produce the CEK Export Blob (step 32). The blob and random number are sent to the system for storage (step 33) and the system stores the CEK Export Blob for future use of the CEK is lost to the system (step 34).

Figure 4:
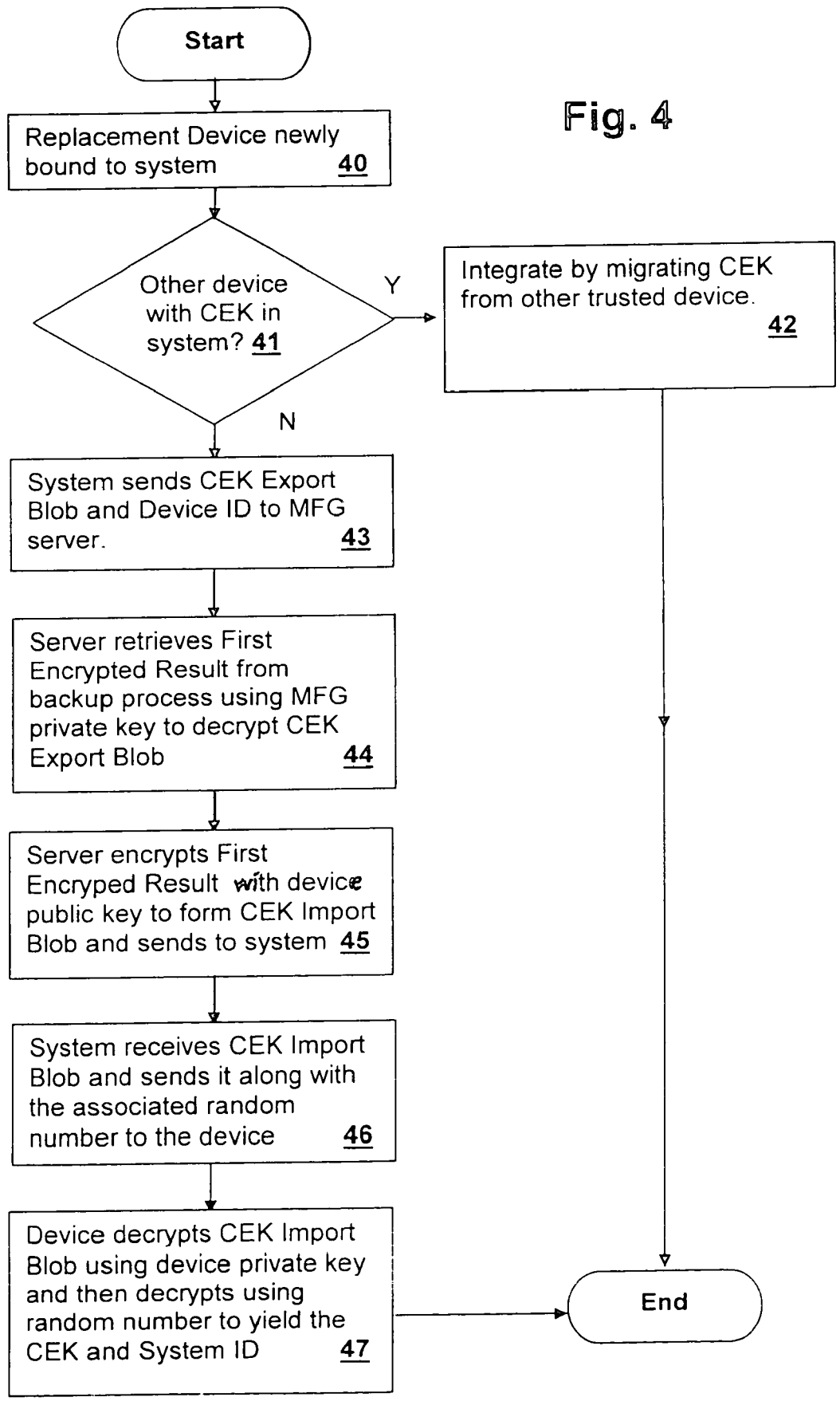
FIG. 4 is a flowchart depicting another portion of a method in accordance with an embodiment of the present invention.

Referring now to FIG. 4, another portion of the method in accordance with the illustrated embodiment of the invention is depicted. When a replacement device is newly bound to the system (step 40), if there is a trusted device in the system that contains the CEK (decision 42), then the CEK is integrated into the replacement device from the other trusted device. However, if there is not a trusted device in the system (decision 42) the CEK is installed from the backup stored according to the method depicted in FIG. 3. First, the system sends CEK Export Blob and the replacement device identifier to manufacturer server 1 (step 43). Manufacturer server 1 decrypts the CEK Export Blob using the manufacturer's private key to obtain the first encrypted result that was generated by the device. Manufacturer server 1 then retrieves the replacement device's public key from database 22 using the provided device identifier and after verifying that the device is properly bound, re-encrypts the first encrypted result (step 45) and sends the resulting CEK Import Blob to the system. The system receives CEK Import Blob and sends it along with the associated one-time random number stored during the backup process to the replacement device.

Finally, the replacement device receives CEK Import Blob and the associated random number, decrypts the CEK Import Blob using its device-specific private key to obtain the first encrypted result, then decrypts the first encrypted result using the random number to obtain the CEK (step 47). The replacement device then proceeds to use the CEK only if the decrypted system identifier matches the system to which the replacement device is bound.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method for secure backup and restore of a context encryption key (CEK) on a device in a secured processing system, said method comprising:
    first encrypting an information including said CEK within a first device using a first key to obtain a first encrypted result, responsive to receiving a request to backup said CEK;
    first storing said first encrypted result outside of said first device;
    first sending said first encrypted result to a server, responsive to receiving a request to restore said CEK;
    first decrypting said first encrypted result at said server using a second key associated with said first key to obtain a decrypted result;
    re-encrypting said decrypted result with a third key to obtain a second encrypted result;
    transmitting said second encrypted result to a second device within said system; and
    second decrypting said second encrypted result within said device using a fourth key associated with said third key to retrieve said information.

2. The method of claim 1, further comprising:
    further responsive to receiving said request to backup said CEK, generating a random number within said first device and second encrypting said information with said random number, whereby said first encrypting doubly-encrypts said information to produce said first encrypted result;

second storing said random number outside of said first device, and wherein said transmitting further transmits said random number to said second device; and third decrypting a result of said second decrypting with said random number to retrieve said information.

3. The method of claim 1, wherein said transmitting comprises:

second sending said second encrypted result to said system;

retrieving said random number from storage; and third sending said second encrypted result along with said retrieved random number to said device.

4. The method of claim 1, wherein said second device is a replacement device for said first device.

5. The method of claim 1, wherein said second device is said first device and said method is used to reinstall said CEK on said first device to repair said first device.

6. The method of claim 1, wherein said first and second key form a public/private key pair and wherein said first key is a public key of said public/private key pair and said second key is a private key of said public/private key pair.

7. The method of claim 1, wherein said third and fourth key form a public/private key pair and wherein said third key is a public key of said public/private key pair and said fourth key is a private key of said public/private key pair.

8. The method of claim 1, wherein said first and second keys form a symmetrical key pair.

9. The method of claim 1, wherein said third and fourth keys form a symmetrical key pair.

10. The method of claim 1, wherein said CEK is a key for encrypting machine contexts for export from said first device and decrypting said contexts on import to said second device.

11. The method of claim 1, wherein said information includes a system identifier associated with said system, and wherein said second decrypting further extracts said system identifier, and wherein said method further comprises:

within said second device, determining whether or not said system identifier matches a second identifier of a system to which said second device is bound; and responsive to determining that said system identifier does not match said second identifier, aborting restoration of said CEK to said second device.

12. The method of claim 1, wherein said first sending further comprises sending a device identifier of said second device to said server, and wherein said method further comprises retrieving said third key from a database using said device identifier.

13. A system comprising:

a plurality of devices intercommunicating and constituting a processing system, said devices each including a memory for storing system program instructions and data and a processor for executing said system program instructions, and wherein said system program instructions include program instructions for first encrypting an information including said CEK within a first one of said devices using a first key to obtain a first encrypted result, responsive to receiving a request to backup said CEK, first storing said first encrypted result outside of said first device, first sending said first encrypted result to a first server, responsive to receiving a request to restore said CEK, second decrypting said second encrypted result within said device using a fourth key associated with said third key to retrieve said information; and a server acting as said first server and coupled via a network to said processing system, said server including a server processor for executing server program instructions and a memory for storing said sever program instructions, and wherein said server program instructions comprise program instructions for first decrypting said first encrypted result using a second key associated with said first key to obtain a decrypted result, re-encrypting said decrypted result with a third key to obtain a second encrypted result, transmitting said second encrypted result to said processing system for transfer to a second one of said devices.

14. The system of claim 13, wherein said system program instructions further comprise program instructions for:

further responsive to receiving said request to backup said CEK, generating a random number within said first device and second encrypting said information with said random number, whereby said first encrypting doubly-encrypts said information;

second storing said random number outside of said first device;

returning said random number to said second device in conjunction with transfer of said second encrypted result to said second device; and third decrypting a result of said second decrypting using said random number to retrieve said information.

15. The system of claim 14, wherein said system program instructions further comprise program instructions for:

receiving said second encrypted result from said server;

retrieving said random number from storage; and third sending said second encrypted result along with said retrieved random number to said device.

16. The system of claim 13, wherein said second device is a replacement device for said first device.

17. The system of claim 13, wherein said second device is said first device and said system program instructions and said server program instructions are executed to reinstall said CEK on said first device to repair said first device.

18. The system of claim 13, wherein said CEK is a key for encrypting machine contexts for export from said first device and decrypting said contexts on import to said second device.

19. The system of claim 13, wherein said information includes a system identifier associated with said processing system, and wherein said system program instructions for second decrypting further extract said system identifier, and wherein said system program instructions further comprise program instructions for:

within said second device, determining whether or not said system identifier identifies said processing system; and responsive to determining that said system identifier does not identify said processing system, aborting restoration of said CEK to said second device.

20. The system of claim 13, wherein said system program instructions for first sending further send a device identifier of said second device to said server, and wherein said server program instructions further comprise program instructions for retrieving said third key from a database of said server using said device identifier.

21. A computer program product comprising signal-bearing media encoding program instructions for execution within a processing system that includes multiple secured devices, said program instructions comprising program instructions for:

encrypting an information including said CEK within a first one of said devices using a first key to obtain a first encrypted result, responsive to receiving a request to backup said CEK;

first storing said first encrypted result outside of said first device;

first sending said first encrypted result to a server, responsive to receiving a request to restore said CEK;

receiving from said server a second encrypted result representing a decryption of said first encrypted result re-encrypted by third key; and second decrypting said second encrypted result within said device using a fourth key associated with said third key to retrieve said information.

* * * * *